US008875660B2

(12) United States Patent
Grabois

(10) Patent No.: US 8,875,660 B2
(45) Date of Patent: Nov. 4, 2014

(54) HABITAT ENCLOSURE

(75) Inventor: Spencer Grabois, Golden Beach, FL (US)

(73) Assignee: Teddy Tank Technology, LLC, Aventura, FL (US)

( * ) Notice: Subject to any disclaimer, the term of this patent is extended or adjusted under 35 U.S.C. 154(b) by 342 days.

(21) Appl. No.: 13/248,585

(22) Filed: Sep. 29, 2011

(65) Prior Publication Data

US 2012/0174870 A1    Jul. 12, 2012

Related U.S. Application Data

(63) Continuation-in-part of application No. 12/986,817, filed on Jan. 7, 2011, now abandoned.

(51) Int. Cl.
*A01K 63/00* (2006.01)

(52) U.S. Cl.
CPC .................................. *A01K 63/003* (2013.01)
USPC ............................ 119/253; 119/250; 119/247

(58) Field of Classification Search
CPC ..... B65D 81/365; A63H 3/005; A01K 63/006
USPC ......... 119/245, 265, 246, 250, 267, 269, 247, 119/253; 446/73, 74
See application file for complete search history.

(56) References Cited

U.S. PATENT DOCUMENTS

| | | | | |
|---|---|---|---|---|
| D90,646 S | * | 9/1933 | Carnes | D30/103 |
| D97,759 S | * | 12/1935 | Carnes | D30/103 |
| D136,064 S | * | 7/1943 | Fordyce | D30/103 |
| D183,463 S | | 9/1958 | Mallamace | |
| 3,420,412 A | * | 1/1969 | Greene | 222/78 |
| D218,253 S | | 8/1970 | Wolfe | |
| 3,618,238 A | | 11/1971 | Willinger | |
| 4,236,352 A | | 12/1980 | Heaney et al. | |
| D288,735 S | * | 3/1987 | Jones et al. | D30/103 |
| 4,726,478 A | | 2/1988 | Zimmermann | |
| D317,517 S | | 6/1991 | DeLuna | |
| D349,979 S | * | 8/1994 | Ulloa et al. | D30/102 |

(Continued)

FOREIGN PATENT DOCUMENTS

WO   PCT/US2011/054717    10/2011

OTHER PUBLICATIONS

International Search Report, PCT/US2011/054717, mailed on Jan. 31, 2012.

(Continued)

*Primary Examiner* — Kristen C Hayes
(74) *Attorney, Agent, or Firm* — Benjamin M. Hanrahan; Hanrahan Law Firm, P.A.

(57) ABSTRACT

A habitat enclosure comprising a removably disposed housing or outer covering shaped or otherwise configured to represent an animate object is presented. Furthermore, the outer covering is disposed in a removable, yet confronting engagement with a container, the container being viewable through a display area of the outer covering. The container also comprises a lid removably disposed relative to a basin in order to allow at least temporary access into said interior portion thereof. The enclosure further comprises one or more access channels disposed through the outer covering and into a communicative relation with the interior portion of the container in order to facilitate feeding, breathing, and/or draining or other maintenance. A lighting assembly is disposed in an illuminating relation with the container such that the apparatus may be used as a night-light or other soothing accent.

18 Claims, 13 Drawing Sheets

(56) References Cited

U.S. PATENT DOCUMENTS

| | | | | |
|---|---|---|---|---|
| 5,386,909 A | * | 2/1995 | Spector | 206/457 |
| 5,632,377 A | * | 5/1997 | Ferrero | 206/457 |
| 5,888,117 A | * | 3/1999 | Sutton | 446/267 |
| 6,029,936 A | * | 2/2000 | Senese | 248/146 |
| 6,119,850 A | * | 9/2000 | Chen et al. | |
| 6,237,787 B1 | | 5/2001 | Gallo et al. | |
| 6,350,169 B1 | * | 2/2002 | Holt | 446/327 |
| D463,073 S | * | 9/2002 | Van Vlake et al. | D30/103 |
| 6,824,112 B2 | * | 11/2004 | Lange | 248/102 |
| 7,341,022 B2 | | 3/2008 | Ming | |
| D608,847 S | * | 1/2010 | Ivanic et al. | D21/661 |
| D684,730 S | * | 6/2013 | Grabois | D30/103 |
| 2006/0288951 A1 | | 12/2006 | Lee | |
| 2006/0292956 A1 | * | 12/2006 | Sayles | 446/8 |
| 2009/0293814 A1 | * | 12/2009 | Rutherford, Jr. et al. | 119/253 |
| 2010/0300369 A1 | * | 12/2010 | Fang et al. | 119/253 |
| 2012/0174871 A1 | * | 7/2012 | Grabois | 119/265 |

OTHER PUBLICATIONS

Written Opinion of the International Searching Authority, PCT/US2011/054717, mailed Jan. 31, 2012.
International Preliminary Report on Patentability, PCT/US2011/054717, issued on Feb. 25, 2014.

* cited by examiner

HABITAT ENCLOSURE

CLAIM OF PRIORITY

The present application is a Continuation-In-Part patent application of previously-filed, U.S. patent application having Ser. No. 12/986,817 and a filing date of Jan. 7, 2011 now abandoned, the content of which is incorporated herein in its entirety by reference.

BACKGROUND OF THE INVENTION

1. Field of the Invention

The present invention is generally directed to a pet or habitat enclosure, which may include an aquatic tank, aquarium, vivarium, or other wet or dry environment suitable for a living creature and/or one or more artificial aquatic animals, plant life or other artificial creatures. In particular, in at least one embodiment, the pet or habitat enclosure comprises a housing and/or outer covering generally representative of or otherwise shaped to resemble a fictional, non-fictional, fantasy, mythical or realistic animate object, animal or character. Specifically, as will be described below, the animate object may include, for example, a teddy bear, any animal, cartoon or comic-strip character, dragon, college or university mascot, professional, holiday figure, a living or deceased athlete, actor/actress, president, a plant, tree, or other organic or botanical organism, etc. As will become apparent from the description herein, the present invention comprises a plurality of features, objects and/or components that serve to "liven" or bring the animate object "to life," or otherwise serve to interact with or entice interaction from the user. In particular, the enclosure of at least one embodiment comprises one or more channels such as a feeding tube, air or breathing tube (disposed at or near the object's mouth), or drainage tube disposed in a communicative relation with the tank or container. In particular, the enclosure of at least one embodiment comprises a movable and/or removable lid in order to provide access to the aquatic tank or other container such as for cleaning or other maintenance. As will be apparent from the disclosure herein, the habitat enclosure and/or the living creature therein is viewable via one or more display or viewing areas, which in a preferred embodiment is disposed at or proximate a midsection, for example, in the stomach area of the teddy bear or other representative animate object, animal and/or figure.

2. Description of the Related Art

Aquariums and aquatic tanks which are designed to house one or more water-dwelling plants or animals are generally common in households as decorative features, and the animals are commonly kept and raised as pets. Many aquariums consist of square, rectangular, round or other geometric shape and may, in some instances, be unsightly.

There is a need in the art for an aquatic tank that is aesthetically pleasing, soothing, and can be used as a relaxing gift to a child, a loved one, and/or to an individual in a hospital or recovering from an illness or injury, for example. In particular, the proposed apparatus will comprise a housing or outer covering generally shaped to resemble an animate object, including, but certainly not limited to a teddy bear, and further comprises a interior illuminating assembly which may be used as a night light to create soothing ambiance, mood and/or environment. The apparatus will further include one or more access channels and a movable or removable lid in order to facilitate feeding, breathing, and maintenance.

SUMMARY OF THE INVENTION

The present invention is directed to an aquatic tank, aquarium, or other habitat enclosure or dwelling (including dry and/or wet environments) comprising a housing or outer covering which is shaped or otherwise structured to resemble an animate object. As described herein, the animate object may be a teddy bear, an animal, a baby, dragon, witch, super hero, or other fictional, non-fictional and/or fantasy character, etc. The animate object-shaped housing or covering may also comprise a plant including a tree or flower.

In any event, the apparatus of the present invention comprises an aquarium, vivarium, or container which is at least partially embedded or disposed within the housing or covering and viewable via a display area or window. As will be apparent from the disclosure presented herein, the container may comprise virtually any shape, including spherical, cubed, multi-sided, flat back, oblong, football-shape, etc. In any event, the container of at least one embodiment is structured to house one or more living, non-living, or artificial plants or animals, and in at least one embodiment, is preferably structured to house aquatic life, including but not limited to fish. Of course, the container may house or provide a (wet and/or dry) habitat or living environment for virtually any animal or pet, including, but certainly not limited to turtles, snakes, lizards, crabs, etc. In at least one embodiment, however, the present invention comprises artificial and/or animated creatures disposed within the container, including, for example, artificial plant life, artificial fish or aquatic creatures, etc. The artificial items disposed within the container may further include water submersible LEDs or light assemblies attached thereto in order to create an elegant light display or night light.

As will be described below in greater detail, the various embodiments of the present invention further comprise one or more access channels, such as a feeding tube, breathing tube, and/or drainage tube. The access channels essentially function as conduits into the container and/or are otherwise disposed in a communicative relation with the interior portion of the container and extend through the interior of the housing or covering. The access channel(s) preferably end at or proximate the outer portion of the housing such as, for example, at or near the object's mouth. Feeding of the fish or other animal within the tank is thus accomplished by disposing food particles into an access channel as if the user were feeding the teddy bear or other animate object. It should be noted, however, that the access channel(s) of at least one embodiment may end at a location within the housing, such that it can be accessed by, for example, tilting the head back, removing the head, opening the mouth, etc.

In at least one embodiment, the object's mouth is structured to operatively move via appropriately structured and disposed electric or mechanical motors or other like structures. In particular, the mouth of such an embodiment is structured at least partially open and close so as to resemble talking, chewing, feeding, or other animations or movements.

As will be discussed in greater detail below, at least one embodiment of the present invention further comprises a lighting assembly disposed in an illuminating relation with the container. The lighting assembly may comprise a low-heat or no-heat light emitting diode (LED). Certain embodiments of the housing comprise a plush material, which may be flammable or burned when exposed to excessive amounts of heat. Accordingly, the lighting assembly of the present invention is structured, configured, and positioned to eliminate or reduce the occurrence of safety hazards such as fires. In addition, with the lighting assembly, the apparatus of the present invention may be utilized as a soothing night light, or other accent to a house or room. In certain embodiment, the lighting assembly may in addition or instead comprise water submersible LEDs or other lights disposed within the container and submersed in water or liquid contained therein. The submersible LEDs or lights may be attached to artificial items disposed therein, such as artificial plant life, trees, etc. and/or artificial aquatic life such as fish, turtles, crabs, etc. In certain embodiments, the artificial items may be animated or independently movable within the container, and represent, for example, swimming or moving aquatic or plant life therein.

Other structural and operative features of the present invention include a camera, microphone, and/or audio-visual recorder, image capturing device, alarm clock, music or audio player, video player, etc. In such an embodiment, the apparatus disclosed herein may be used as a monitoring device, security camera, baby listening device, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
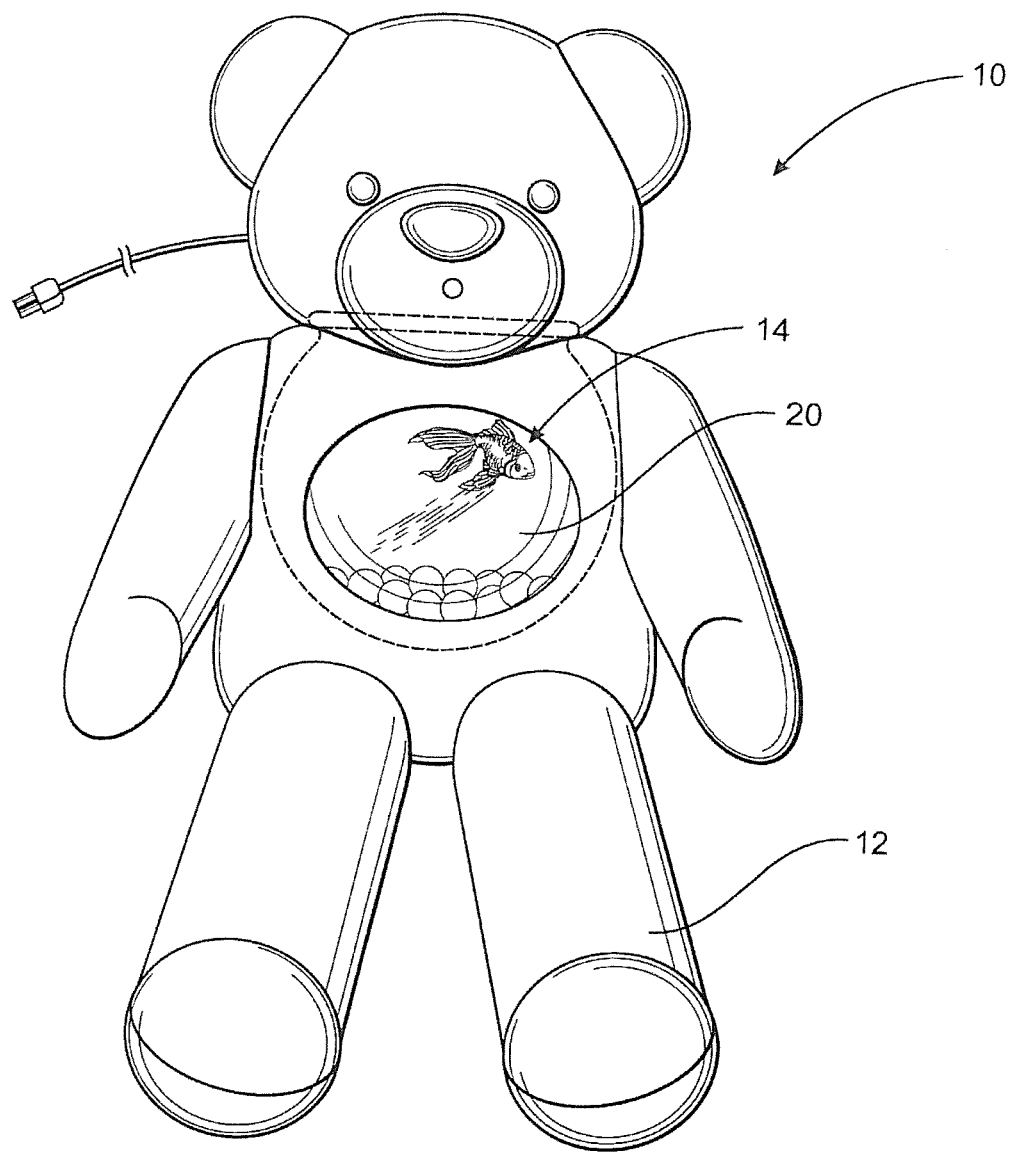
FIG. 1 is a front elevation view of the habitat enclosure disclosed in accordance with at least one embodiment of the present invention.

As shown in the accompanying drawings, and with particular reference to FIG. 1, the present invention is directed to a pet or habitat enclosure, which may include an aquatic tank, a dry or wet aquarium, vivarium, or other wet and/or dry environments suitable for one or more living creatures. Specifically, the habitat enclosure and/or aquatic tank of the various embodiments is generally shaped to resemble an animate object, generally referenced at 10. In particular, the aquatic tank and/or habitat enclosure 10 of the various embodiments of the present invention comprises a housing or outer covering 12 cooperatively structured and configured to at least partially house, enclose and/or support a tank or container 20 such as an aquarium disposed therein. The housing or outer covering 12 of at least one embodiment is structured and/or configured to be representative of or otherwise shaped to simulate an animate object or character. As generally represented in the embodiment shown in the figures, the animate object of at least one embodiment may comprise a teddy bear or other stuffed animal or toy. However, the housing 12 may be structured to resemble virtually any animate object which comprises any fictional, non-fictional, fantasy, mythical, and/or realistic object, animal or character, including but in no manner limited to a cartoon or comic-strip character, dragon, college or university mascot, a living or deceased athlete, actor/actress, or president, a plant, tree, or other organic or botanical organism, etc.

Furthermore, the housing 12 of at least one embodiment comprises a substantially plush material such as that commonly used for stuffed animals or stuffed toys. For instance, the plush material may comprise one or more fabrics or textile materials such as cotton, wool, polyester, silk, and/or other natural or synthetic fiber(s). Of course, the housing 12 may comprise virtually any material, and may be a hard or soft plastic, aluminum, metal, leather, etc.

More in particular, the housing 12 of various embodiments of the present invention comprises at least one display area or display window 14 disposed on a predetermined portion thereof. For exemplary purposes only, the display area 14 may comprise a removed, or otherwise open area of the housing 12 through which the container 20 is viewable from a position exterior to the housing 12. Specifically, the container 20 may protrude slightly though the display area 14 and bulge outward toward the exterior of the housing 12. In another embodiment, however, the display area or window 14 comprises a transparent or translucent pane or shield through which the container 20 is viewable.

Figure 2:
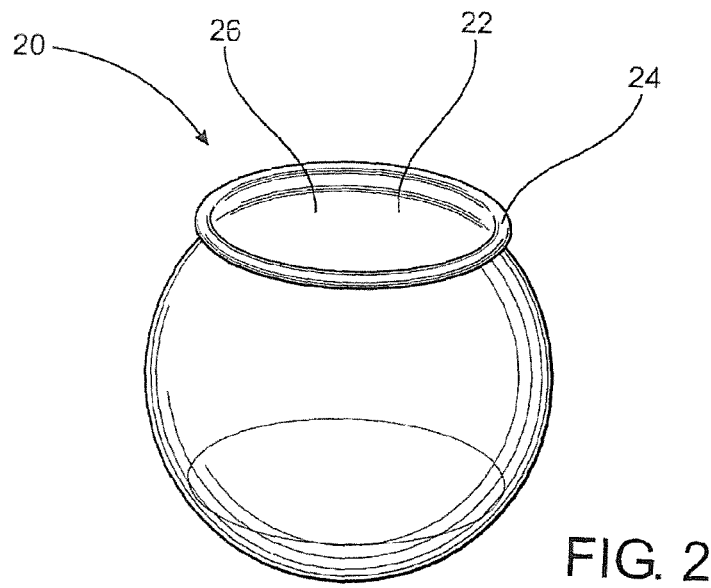
FIG. 2 is a front elevation view of the container illustrated in the embodiment shown in FIG. 1.

Referring now to FIG. 2, the container 20 of at least one embodiment comprises an aquatic tank, bowl, or other structure having an at least partially hollow interior portion 22 which is cooperatively dimensioned, structured and configured to house a living creature, such as an aquatic or other animal including a fish, turtle, snail, etc. The container 20 of the various embodiments may be of virtually any size and may be configured to house fresh or salt water environments including the various different fish, animals, or other living creatures therein. The container 20 illustrated in FIG. 2 is merely representative of at least one embodiment, and thus the container 20 of other embodiments may comprise a different shape, size and/or configuration. The container 20 of the various embodiments is preferably made of plastic, glass or acrylic, and may, in at least one embodiment, be shatter proof or not easily breakable. As will be discussed in greater detail below, and as generally representative in FIG. 2, the container 20 of at least one embodiment comprises a peripheral edge 24 disposed around an upper, open portion 26 thereof. The peripheral edge 24 is cooperatively structured to telescopically connect, engage or abut with a similar peripheral lip disposed on a movable or removable lid 30.

Figure 3:
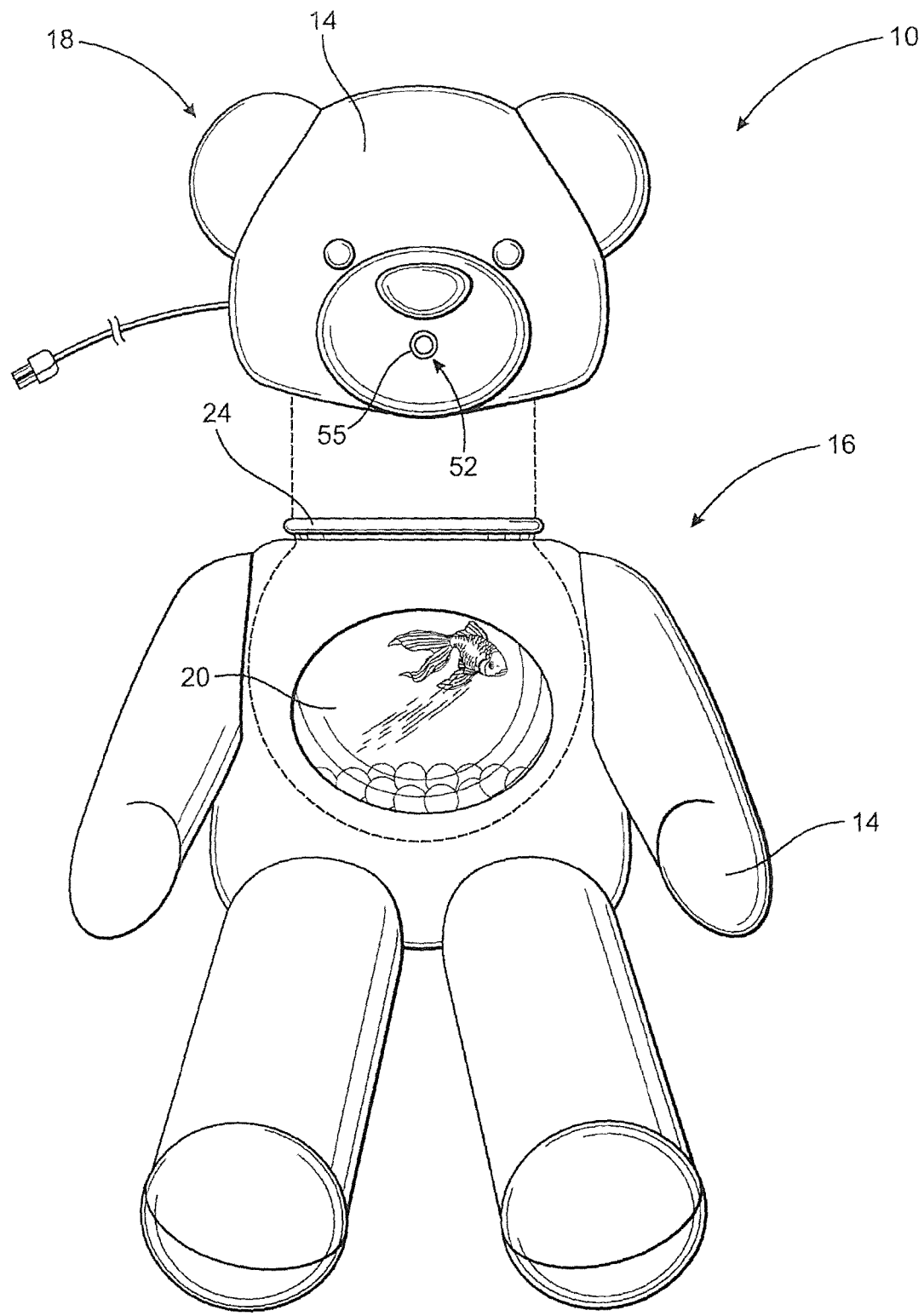
FIG. 3 is a partially exploded view of the habitat enclosure illustrated in FIG. 1.

As illustrated in the exploded view of FIG. 3, the housing 14 of at least one embodiment comprises a body portion 16 and a removably disposed upper portion or head 18. While the embodiment of FIG. 3 illustrates that the upper portion or head 18 is completely removable and/or separable from body portion 16, in yet another embodiment, the upper portion 18 may be movably disposed relative to the body portion 16, for instance, pivotal via a hinge or other similar pivoting or sliding mechanism connected therebetween. In addition, the corresponding connecting edges on the lid and bowl, container or basin may comprise a resilient gasket, suction devices, etc. in order to facilitate a tight, yet removable relation there between. Specifically, the lid 30 (illustrated in the bottom view of the head portion 18 of FIG. 4) is disposable in an at least partially removable relation to the container 20 in order to provide temporary access into the interior portion 22 thereof. For instance, the lid 30 may be completely removable or disposed in a pivotal, sliding, or other movable relation to the container 20 so as to provide access into the container 20 for maintenance, cleaning, etc.

Figure 4:
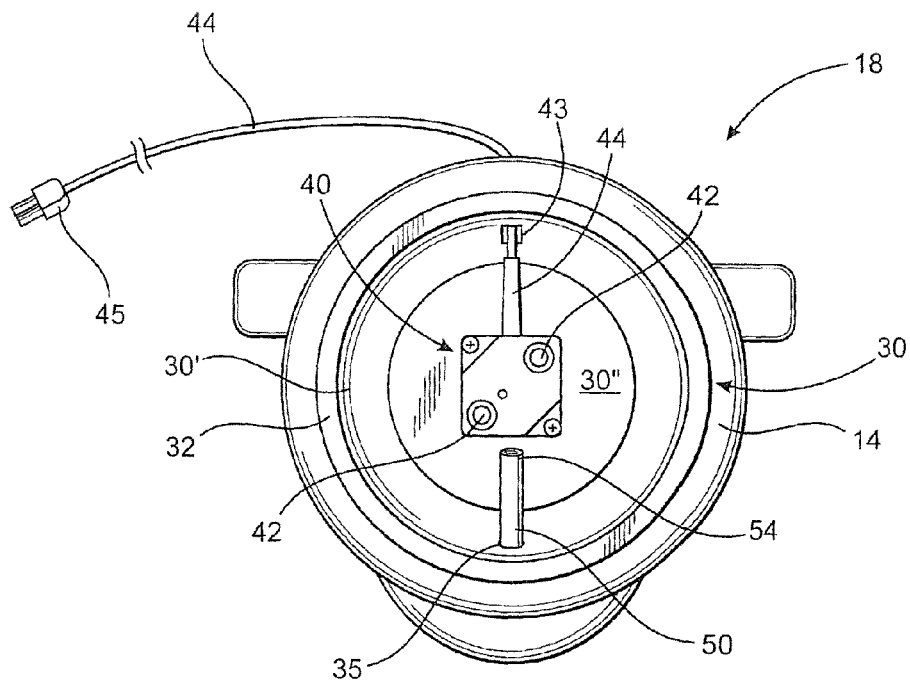
FIG. 4 is a bottom view of the upper portion of the housing illustrated in FIGS. 1 and 3.

As shown in the inside or bottom view of the upper portion 18 illustrated in FIG. 4, the lid 30 of at least one embodiment is embedded within or otherwise connected to a bottom end of the upper portion 18 of the housing 14. In such an embodiment, removal of the upper portion 18 from the body portion 16 serves to also simultaneously remove the lid 30 from the container 20.

In addition, the lid 30 may connect to or engage the container in a number of different ways so as to facilitate the practice of the present invention in the intended manner. For instance, the lid 30 of at least one embodiment comprises a peripheral lip 32 such as a step or groove which is cooperatively structured to be disposed in an overlapping and/or telescopic relation with the cooperatively disposed peripheral edge 24 of the container 20. The lip 32 and edge 24 of at least one embodiment may be loosely connected or engaged to one another such that if a passerby or user accidentally bumps, nudges, or collides with the upper portion 18 and/or the table or supporting surface on which the present invention is disposed, the upper portion 18 and lid 30 are structured to disconnect from the body 16 and container 20, respectively, without the body 16 and container 20 falling over. In the embodiment where the lid 30 is movable, slidingly engaged or pivotal relative to the container, the upper portion 18 and lid 30 is structured to slide, pivot or otherwise easily move in the event of inadvertent or accidental contact. Such a feature serves to eliminate or minimize accidental spilling of the contents of the container 20. However, in another embodiment, the lid 30 and container 20 may be securely engaged with one another, for example, via a plurality of cooperatively disposed notches and grooves, clips, tabs, and/or with threaded grooves to facilitate a screw-top.

As also illustrated in FIG. 4, the present invention further comprises a lighting assembly 40. The lighting assembly 40 of the various embodiments is operatively disposed in an illuminating relation with the interior portion 22 of the housing 20. For instance, as shown in the embodiment of FIG. 4, the lighting assembly 40 may be connected to an undersurface or inside portion 30' of the lid 30 such that when the lighting assembly is turned on or activated and the lid 30 is operatively connected to the container 20, one or more lights serve to illuminate the interior portion 22 of the container 20. More in particular, the lighting assembly 40 may be securely fastened to the inside portion 30' of the lid 30 via one or more screws and/or a supporting plate 30", which may comprise wood, plastic or other structures capable of facilitating the mounting of the lighting assembly 40. Moreover, at least one embodiment of the lighting assembly 40 comprises one or more low-voltage, low heat light emitting diodes (LEDs) 42 capable of emitting light into the container 20. Of course, other lighting structures may be used such as light bulbs, halogen bulbs, fluorescent lights, etc. In addition, the lighting assembly 40 may comprise multiple colors, changing colors, flashing lights, etc.

In any event, the lighting assembly 40 of at least one embodiment is connected to or otherwise comprises a power source, which may be in the form of one or more replaceable batteries. However, as also illustrated in FIG. 4, the lighting assembly 40 of at least one embodiment comprises a power cord or cable 44. As illustrated, the power cord 44 is disposed through the lid 30 and upper portion 18, such as via cooperatively structured and disposed opening 43. The opposite end of the power cable comprises a coupling device or plug 45 connectable to a power source, such as a wall outlet. In such an embodiment, the lighting assembly 40 is preferably, but not necessarily, disposed on or connected to the lid 30 or upper portion 18 such that if an individual or passerby accidentally trips on or pulls the power cord 44, the lid 30 and upper portion 18 will disconnect or disengage from the container 20 and body 16 respectively, without having the container 20 tip over and spill.

In particular, and still referring to FIG. 4, opening 43 through which the LED or other lighting assembly cord 44 is disposed may be of a larger dimension than the cord 44. Thus, the opening 43 of at least one embodiment is structured to facilitate the flow of air or oxygen into the lid 30 and into the container 20, such as through the unoccupied space around cord 43.

In a preferred embodiment, the lighting assembly 40 is disposed between one and twelve inches above the water level in the container 20. However, the lighting assembly 40 need not be disposed within the lid 30 or even above the water level, and may instead be virtually anywhere within the body 16 or upper portion 18 so long as it is disposed in an illuminating relation with the container 20. For example, the lighting assembly 40 may be disposed on one or more of the sides of the container 20, beneath the container 20, etc.

In other embodiments, however, the lighting assembly may comprise submersible lights or LEDs structured to operate and function while submersed or disposed at least partially or completely within a body of water. Accordingly, the lighting assembly, and in particular, the submersible lights or LEDs may be disposed within the water or liquid in the container and operate to illuminate at least a portion of the interior of the container. Furthermore, the submersible lights may be connected or attached to artificial items or objects within the container, including, but certainly not limited to artificial plant life, trees, Christmas or holiday trees or decorations, and/or artificial fish, crabs, turtles, etc. submersed in the water or liquid. In certain embodiments, the present invention comprises one or more animated or movable artificial items or aquatic life with attached submersible LEDs or lights. Accordingly, in at least one embodiment, instead of (or in addition to) live fish or other animals, an artificial, animated, and/or movable item structured to resemble a fish or other life form may be disposed within the container. The artificial item may include an attached, connected or embedded light or LED, such as a submersible LED.

Moreover, certain embodiments of the present invention further comprise one or more access channels 50 disposed at least partially within the housing 12 and being further fluidically or otherwise communicatively connected between the interior portion 22 of the container 20 and an exterior of the housing 12. For instance, the one or more access channels 50 are structured to provide a way to easily feed the fish or other living creature disposed within the container 20. Accordingly, the access channel 50 of at least one embodiment comprises a tube having a sufficient dimension and circumference structured to transfer food or other substance into the container 20.

Accordingly, the access channel(s) 50 comprises a first accessible end 52 disposed at or proximate an outer surface of the housing 12 and in an accessible relation to the user. For instance, as illustrated in FIG. 3, the first end 52 is disposed at or near the teddy bear's mouth and is always open and accessible. Referring again to FIG. 4, the second end 54 of the access channel 50 of at least one embodiment is disposed at or near the lid 30. Thus, when the lid 30 is connected to the container 20, the access channel 50 is thereby disposed in a fluid or other communicative relation with the interior portion 22 of the container 20. For instance, the access channel 50 may be disposed at least partially through the lid 30, such as through a cooperatively structured and disposed opening 35, and into the fluid or accessible relation with the interior portion 22 of the container 20. More in particular, the first end 52 of the access channel 50 of at least one embodiment is preferably disposed at an elevation above the second end 54 such that any food or other particle or substance, such a water conditioner, medication, etc., is transferred though the access channel 50 by virtue of gravitational force and/or a small amount of applied force from the user.

In yet another embodiment, one or more of the access channels 50 are structured and configured to define a substantially continuous path for a flow of air to travel between the exterior of the housing and the interior portion 22 of the container 20 in order to supply oxygen to the living creature or otherwise into the interior portion 22 of the container 20. In such a case, the first end 52 may but need not be disposed at an elevation above the second end 54. Furthermore, such an access channel(s) 50, which is preferably always open in order to continuously supply or circulate air or oxygen into the interior portion 22 of the container 20, may thus comprise a screen or filter at one or more ends and/or along the length thereof in order to keep unwanted debris or materials out of the container 20. The screen of at least one embodiment comprises a mesh-like material or structure disposed within the channel 50.

Accordingly, in a preferred embodiment of the present invention, one access channel or tube 50 is disposed or otherwise accessible at or near the object's mouth and second access channel or tube 50 is disposed or otherwise accessible at the top of the object's head 18. The access channel 50 disposed at or near the top or peak of the object's head creates a substantially straight conduit into the container 20 and is ideal for disposing food particles there though without the particles being lodged or otherwise stuck in the tube. The two access channels 50 also provide a sufficient amount of oxygen to the fish or other creature in the container 20. It should be noted, however, that the access channels 50 may be disposed at other locations on or around the object and further, additional access channels 50 may be added to provide additional flow of oxygen or additional locations to feed the living creatures.

Figure 5:
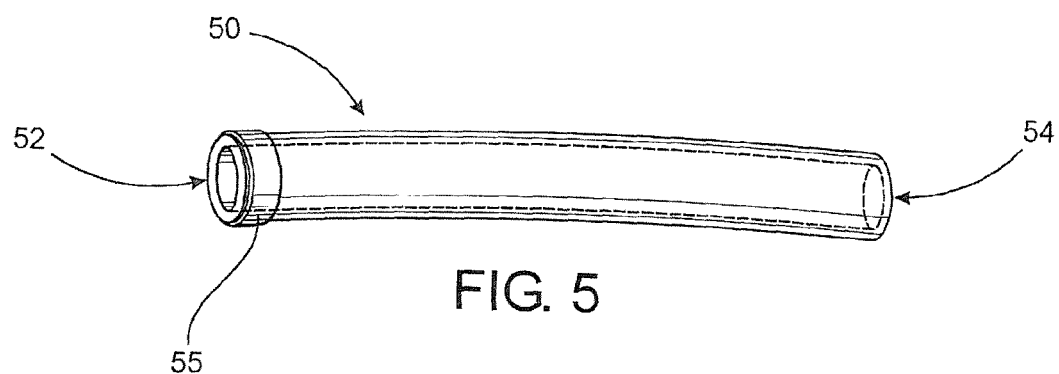
FIG. 5 is a schematic representation of an access channel as disclosed in accordance with at least one embodiment of the present invention.

As best illustrated in FIGS. 3 and 5, at least one embodiment of the present invention further comprises a cap or ring 55, such as a grommet ring, disposed on the end of the access channel or tube 50. The ring 55 of at least one embodiment comprises a metallic or plastic grommet cap which is structured to easily identify the access channel or tube 50 to a user. For instance, the ring(s) 55 may be color coded and structured to identify whether the particular access channel 50 is a feeding tube, air tube, drainage tube, etc. Further, the end cap or ring 55 of at least one embodiment may also be configured or structured to maintain the end 52 of access channel 50 in its operative position, such as, for example, at or near the object's mouth region. For example, with the added ring 55, the end 52 of the access channel 50 may create a tight fit around the periphery thereof, thereby minimizing inadvertent recession or sinking of the end 52 into the housing 12.

Figure 6:
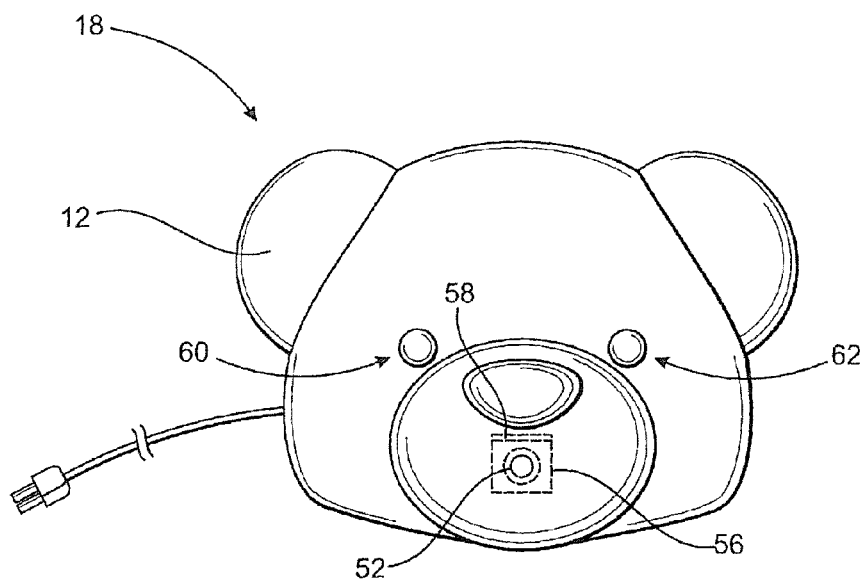
FIG. 6 is a front elevation view of the upper portion of the housing as disclosed in accordance with another embodiment of the present invention.

Furthermore, as illustrated in FIG. 6, in at least one embodiment, one or more of the access channels 50 comprises a closure mechanism 56 disposed at or near an end 52 thereof. For instance, the closure mechanism 56 is structured to selectively dispose the end 52 of the access channel 50 between an open orientation and a closed orientation. For instance, the closure mechanism 56 of at least one embodiment comprises a movable or removable end cap, plug, flap and/or stop. As illustrated in FIG. 6, the closure mechanism 56 comprises a pivotal flap connected to the housing 12 via a hinge 58 which may be in the form of a living hinge, stitches, adhesive, etc. disposed on a side or end of the closure mechanism 56 which allows the flap or mechanism 56 to selectively pivot into and out of an open and closed orientation. In any event, the closure mechanism 56 may comprise a plush material, textile material, plastic, metal, or virtually any material structured to facilitate the practice of the present invention in the intended manner Specifically, the closure mechanism 56 as illustrated in FIG. 6 is structured to keep unwanted debris or material out of the container 20 and can be selectively opened for a user to dispose food or other substance into the first end 52 thereof. As described above, the food or other substance will then travel through the access channel 50 via gravitational force and into the interior portion 22 of the container 20.

As discussed above, the various embodiments of the present invention may comprise any number of access channels 50, each comprising a first end 52 disposed at or proximate different locations of the housing 12. For instance, at least one embodiment comprises an access channel 50 or "feeding tube" accessible via a first end 52 disposed in a facial region of the housing 12, for instance at or near the animate object's mouth, nose, etc. The feeding tube may but need not comprise a selectively disposable closure mechanism 56 as disclosed above. In addition to or instead of the feeding tube, at least one embodiment comprises an access channel 50 or "breathing tube" having a first end 52 disposed at the rear of the housing 12, for instance, at the back of the animate object's head. The breathing tube is preferably always open and may, but need not comprise a filter or screen as disclosed above.

Figure 9:
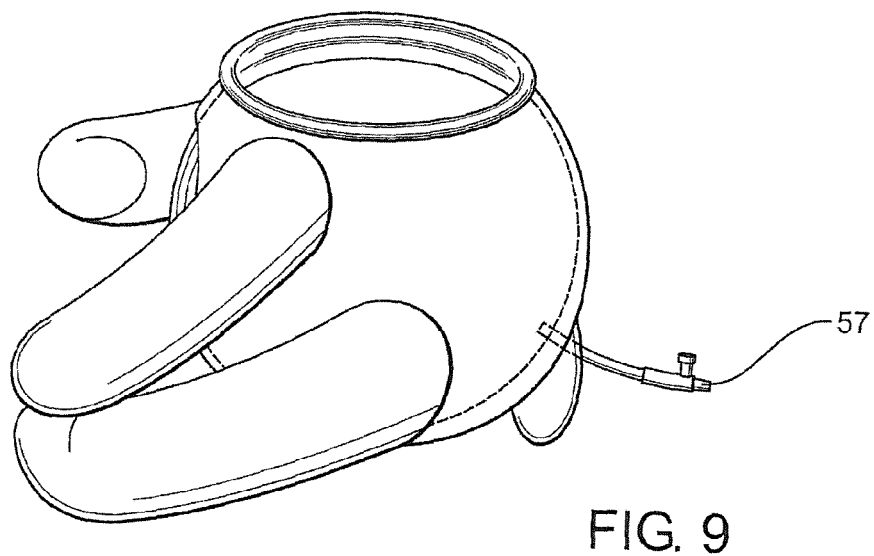
FIG. 9 is a partial side view of the habitat enclosure of at least one embodiment comprising a drainage assembly.

Moreover, as illustrated in FIG. 9, at least one embodiment of the present invention comprises one or more drainage tubes or assemblies 57 disposed in a fluidically communicative relation with the interior portion of the container 20. For instance, the drainage tube 57 comprises a first end connected to the container 20, such as at or near the bottom of the container 20, and a second end exiting the housing 12, preferably at a position lower than the first end thereof. In addition, the drainage tube 57 comprises one or more valves 57', such as a ball valve, screw valve or other tight seal that is disposable between an open and a closed orientation. Accordingly, with the valve 57' selectively disposed in the "open" position, the drainage tube 57 may be used to easily and efficiently drain the water or other fluid content of the container 20. With the valve 57' selectively disposed in the "closed" orientation, water or other fluid or contents may be disposed into and remain within the container 20.

Figure 11:
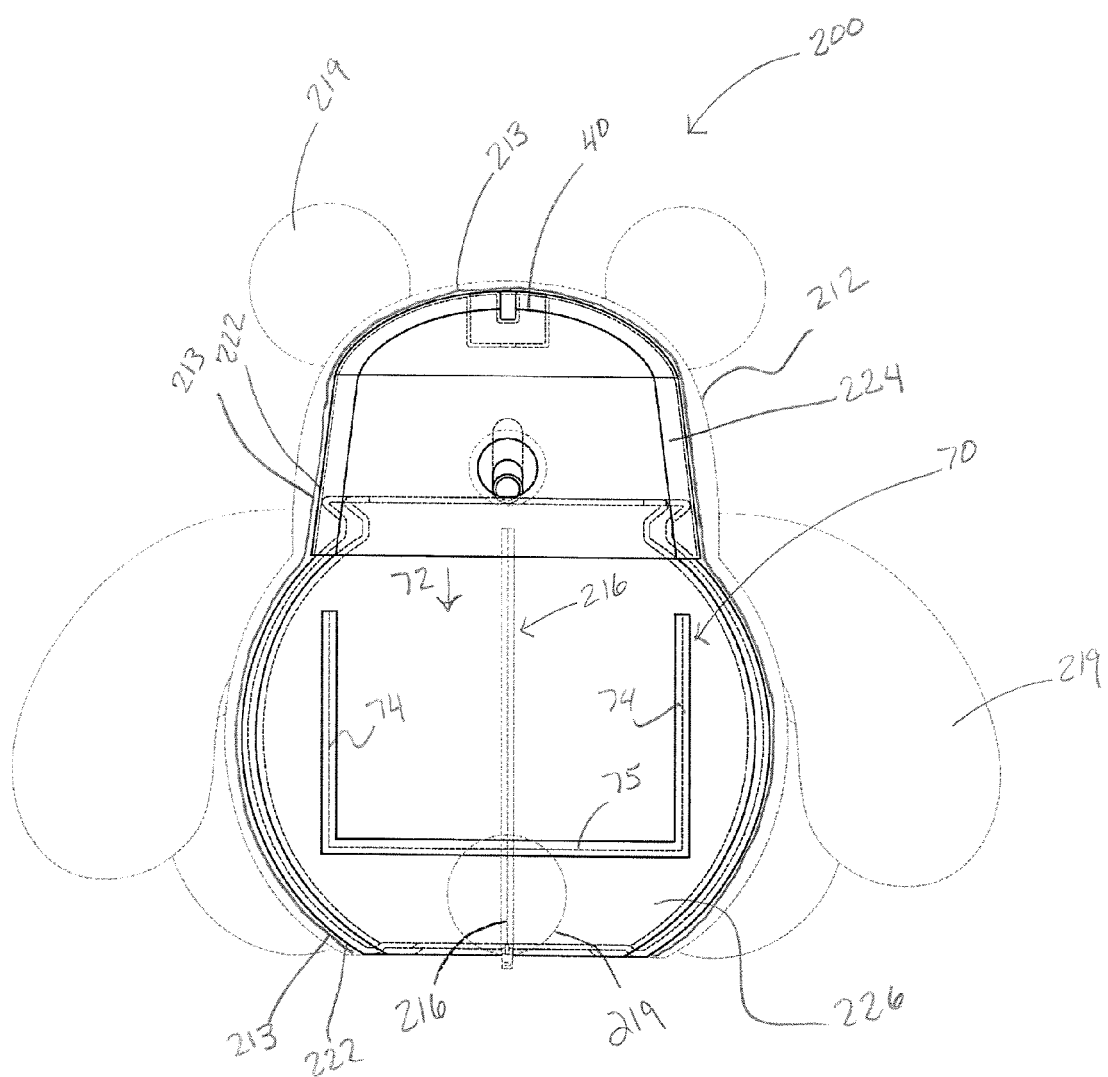
FIG. 11 is a rear view of the embodiment illustrated in FIG. 10.

Further, as exemplified in FIG. 11, at least one embodiment may further comprise a picture frame assembly or image display assembly 70 mounted on or otherwise disposed on at least one side or a back portion of the container 20 such that a picture, photograph, artwork or other visually appealing item or image may be disposed therein. The image display assembly 70 of at least one embodiment comprises a slot 72 defined by opposing side walls 74 and a bottom support 75 connected to the container in a small spaced relation thereto, such that an image or other thin, paper-like item may be disposed or supported therein. The image display assembly 70 of at least one embodiment may be a fixed size (e.g., 3×5, 4×6, 5×7, etc.) or adjustable by virtue of sliding opposing walls 74 inward and outward to fit different sized images. In particular, when viewing the container 20 through display window 14, the picture frame assembly may be disposed on the opposite side or backend of the container 20 such that a picture or other object disposed therein is viewable through the container 20.

Additionally, one or more embodiments of the present invention further include an audiovisual monitoring device, timer, alarm, recording device, or other technological enhancements, generally represented as 60. For instance, an audiovisual monitoring device 60, such as a video camera, still camera, microphone, or speaker may be embedded into the housing 12 and configured to monitor the environment external to the housing 12. Although the device 60 is illustrated in FIG. 6 as being disposed at or near the objects eyes, the device 60 may be embedded or disposed virtually anywhere on the aquatic tank or enclosure 10 of the present invention, including, but not limited to the lid 30, housing 12, etc. In such an embodiment, the apparatus 10 of the present invention may be utilized as a baby monitor, security camera, or other recording and/or transmitting device. The apparatus 10 of at least one embodiment further comprises a local memory device structured to record and store the visual and audio data. It is also contemplated that the apparatus further comprises a transmitter through which the data may be communicated to a remote location, such as via a short range local network including Bluetooth or via the Internet or other networks. In addition, the present invention may comprise a timer, alarm or other indicator 62 which is configured to periodically emit a signal representative of a feeding time for the living creature disposed within the container 20. As represented in FIG. 6, the indicator 62 is embedded or disposed within the object's eye, however, it may be disposed anywhere on or within the housing 12. Particularly, the indicator 62 may comprise a visual indicator, such as a flashing light, colored light, etc., or an audible indicator, such as a beep or chime.

Figure 7:
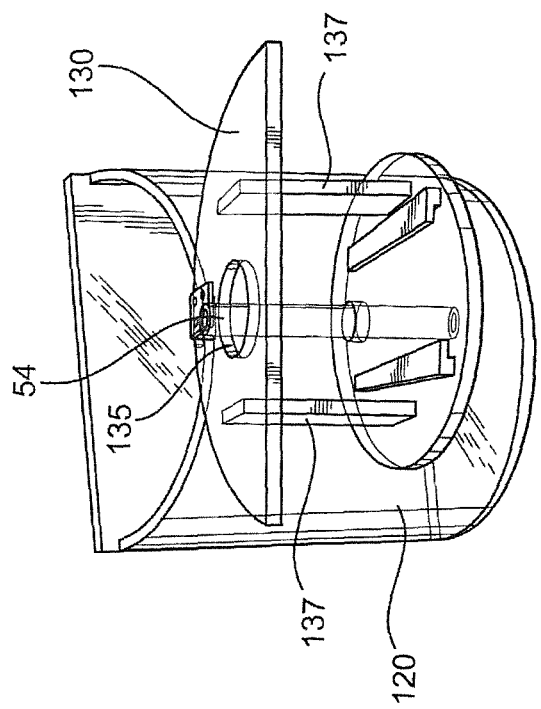
FIG. 7 is a front view of a container and lid disposed in an open orientation as disclosed in accordance with yet another embodiment of the present invention.
Figure 8:
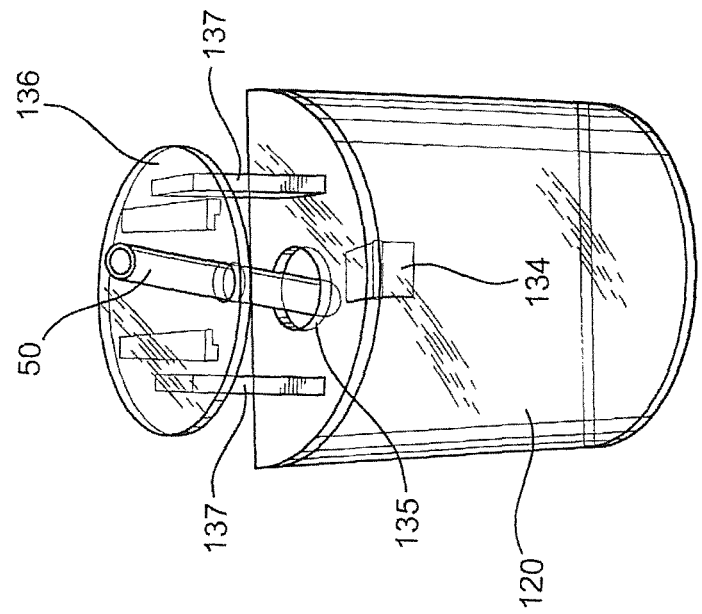
FIG. 8 is a front view of the container and lid shown in FIG. 7 disposed in a closed orientation.

Additional structural variations to the container 120 and lid 130 are illustrated in the embodiment shown in FIGS. 7 and 8. In particular, the lid 130 of the illustrated embodiment is movably disposed relative to the container 120 by virtue of a pivoting hinge 134 connected therebetween. Accordingly, the lid 130 is disposable between an open orientation (illustrated in FIG. 7) and a closed orientation (illustrated in FIG. 8) by movably disposing or pivoting the lid 130 open. In at least one embodiment, the housing 12 (not shown in FIGS. 7 and 8) also pivots open wherein the lid 130 is connected to or otherwise disposed within upper portion 18 and the container 120 is disposed within body 16.

Furthermore, lid 130 of at least one embodiment comprises an opening 135 through which a cooperatively structured access channel or tube 50 is disposed. Accordingly, access channel 50 is positioned in a fluidically or other communicative relation with the interior portion 22 of container 20 in order to facilitate disposition of food or other particles therein, in order to create a substantially continuous path of air or oxygen therein, and/or in order to provide an efficient way to drain water from within the container 120, similar to the embodiment described in detail above. Moreover, the opening 135 may comprise a dimension larger than the circumference or area of the corresponding access channel 50 in order to further facilitate circulation or disposition of air or oxygen in the container 120.

In addition, and still referring to FIGS. 7 and 8, the present invention further comprises an upper shield and/or support structure 136 secured in a spaced relation to the corresponding lid 130, for example, via one or more supporting legs 137. In particular, upper shield member 136 is structured to prevent or minimize the amount of unwanted material or objects being deposited within the container 120, including, for example, stuffing, hair, stray threads, etc. In addition, upper shield member 136 comprises a mounting assembly, such as receiving channels 140, which are structured to engage or sliding receive a cooperatively structured lighting assembly. As above, the lighting assembly of at least one embodiment comprises one or more low-heat LEDs for purposes of safety.

Figure 10:
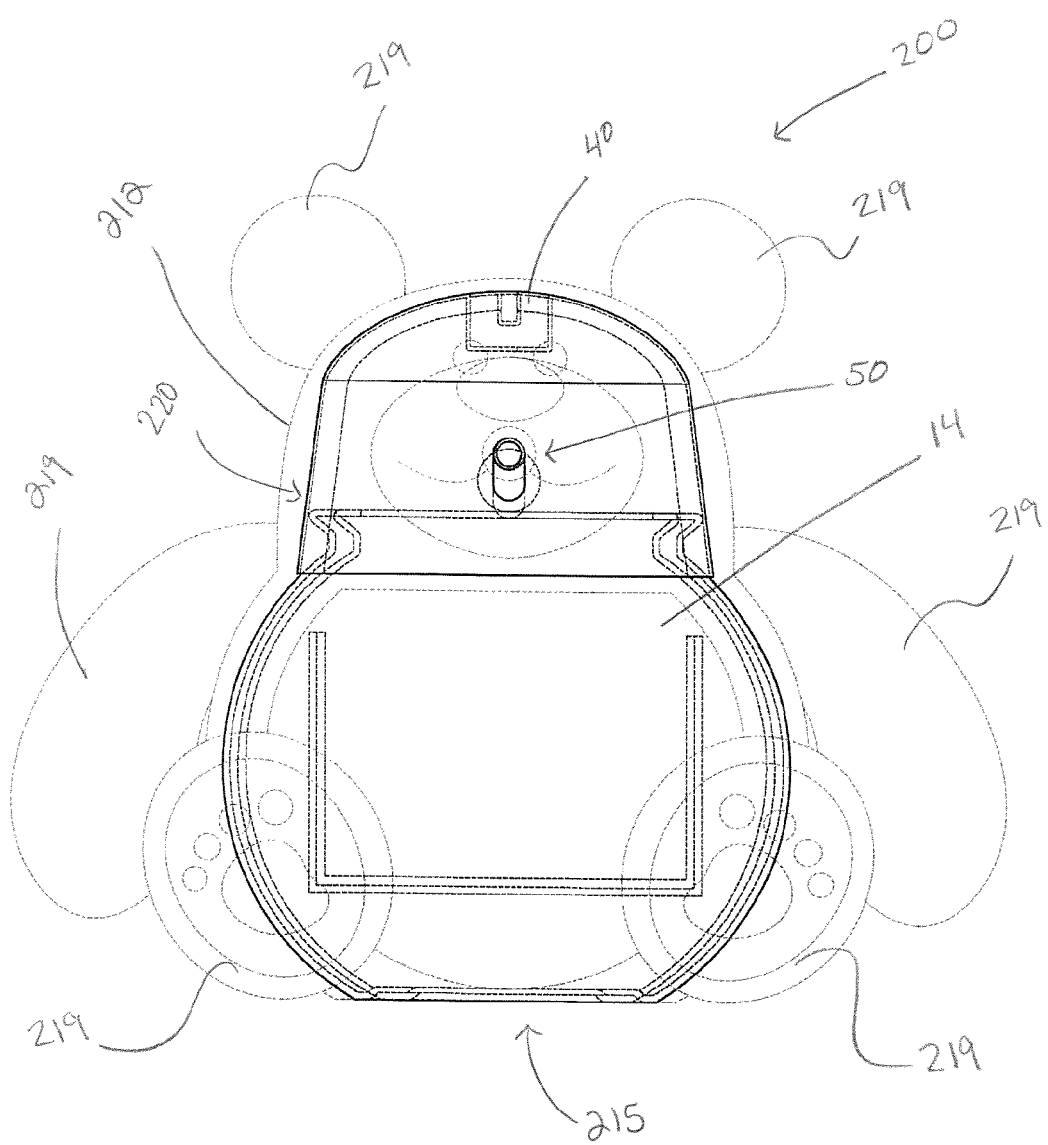
FIG. 10 is a front view of yet another embodiment of the habitat enclosure of the present invention.

As shown in FIG. 10, further structural features of at least one embodiment of the present invention include a housing and/or outer covering 212 that is disposed in a removable surrounding relation with the container 220. As discussed in reference to the embodiment disclosed above and as illustrated in the Figures, the housing or outer covering 212 is structured to at substantially surround the container 220, which is visible through the outer covering 220 by virtue of the display area 14. In the embodiments illustrated in FIGS. 10-15, the outer covering 212 may be easily removed from the surrounding relation with the container 220. In such a case, the outer covering 212 may be washed, cleaned, replaced with a different covering, etc.

Figure 12:
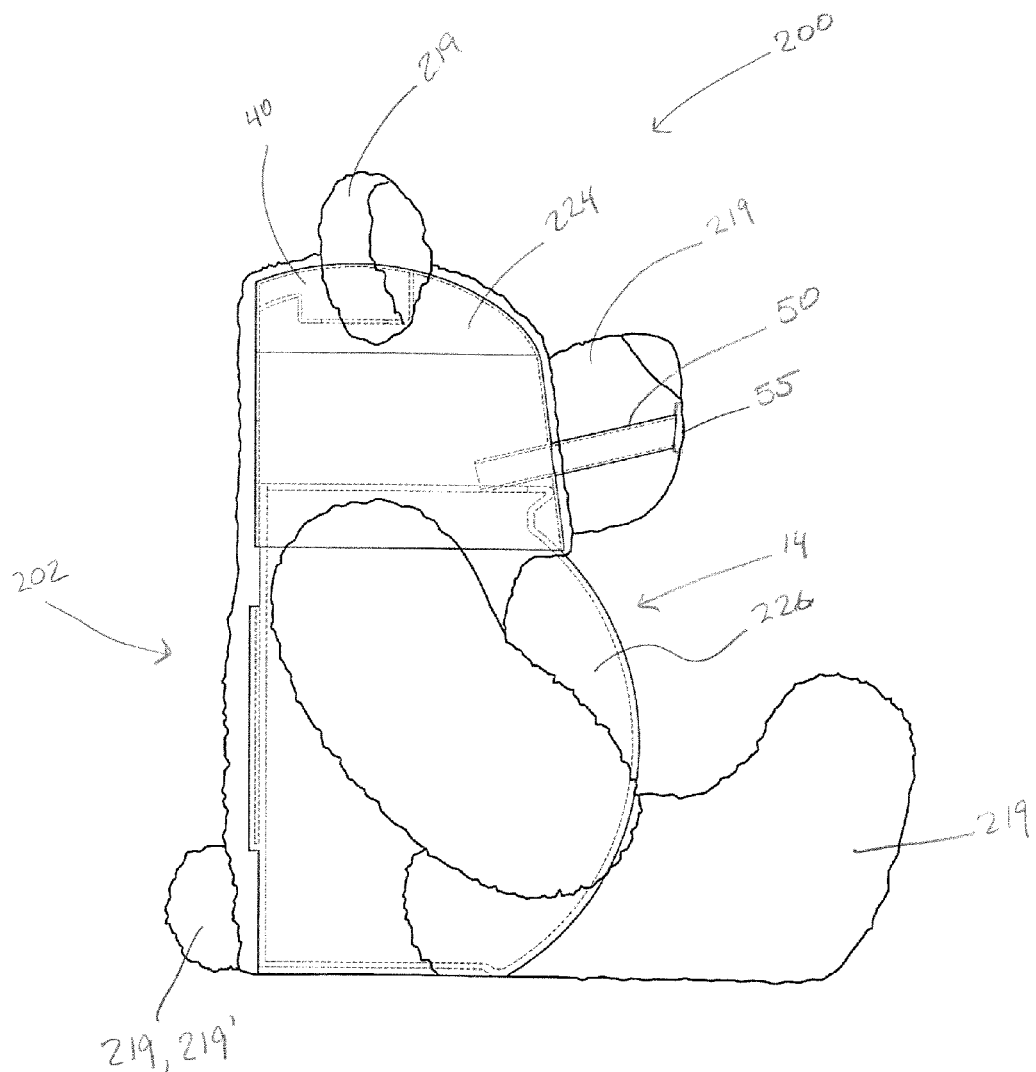
FIG. 12 is a side view of the embodiment illustrated in FIG. 11.

Specifically, the outer covering 212, and in particular, an inner surface 213 thereof, is disposed in an operative, confronting relation with the container 220 (as generally illustrated, for example, in FIGS. 10-12). In such an embodiment, the inner surface 213 of the outer covering 212 is structured to removably confront or engage an outer surface 222 of the container 220, at least while the outer covering 212 is disposed in the operative, confronting relation. As an example, the inner surface 213 of the outer covering 212, or at least a portion of the inner surface 213, comprises a flexible, elastic, or other resilient material that is cooperatively structured to engage, confront or otherwise at least partially push against some portions of the container 220, including portions of the lid 224 and the basin 226. Moreover, the elasticity or resiliency of the outer covering 212, and in particular, the inner surface 213 thereof, of at least one embodiment, is structured to facilitate a removable, yet snug connection between the outer covering 212 and the container 220. In any event, the various embodiments, as disclosed herein, comprise a plush or soft outer surface, as discussed above relative to other embodiments.

It should also be noted, that in at least one embodiment, the outer covering 212 comprises a single-piece or otherwise continuous construction, meaning that the various appendages, including the head, body, arms, legs, tail(s), ear(s), etc, as applicable, are connected or attached to one another as a single piece and removable from the container 220 as a single piece. Of course, the outer covering 212 may comprise multiple components, layers, etc. and still be considered a single-piece or continuous construction as described herein. In particular, outer covering 212 of the present invention comprises a plurality of appendages 219, such as one or more arms, hands, paws, legs, feet, ears, snouts, noses, as well as additional weapons, wands, shields, hats, shoes, gloves, bows, etc.

Some or all of the various appendages 219 may be stuffed with cotton, stuffing, or other like resilient or soft materials commonly found in stuffed animals or stuffed toys. In such a case, the stuffed appendages of at least one embodiment are isolated from the interior portion of the outer covering 212 (e.g., the inner opening defined by inner surfaces 213 which is structured to engage or confront the container 220). In particular, the appendages 219 may be isolated from the inner portion of the outer covering 212 by virtue of one or more seams, stitches, a mesh layer, or other barrier structured to maintain the stuffing within the designated appendage and eliminate inadvertent or unintended removal of the stuffing therefrom.

Additionally, when the outer covering 212 is disposed in the operative, confronting relation with the container, as discussed above, the outer covering 212 is structured to compress or otherwise exert a force upon the lid 224 of the container so as to maintain the lid 224 disposed in the operative, connected or covering relation with the basin 226. This will therefore minimize accidental removal of the lid 224 from the basin 226, for example, upon an inadvertent bump, nudge or shake, which many children may tend to inflict on the aquatic tank 200 of the present invention during use, feeding, etc.

Furthermore, the outer covering 212 of at least one embodiment comprises an open bottom end 215. The open bottom end 215 of the outer covering 212 allows the flat bottom end of the container 220 to sit or otherwise directly contact a supporting surface such as, but not limited to a desk, counter top, etc. This ensures that the outer covering 212 does not bunch up at the bottom of the tank 200 or otherwise create an unstable support for the tank 200. In addition, with the open bottom end 215, the outer covering 212 may slide onto the container 220 of the present invention and into the operative, confronting relation with the container 220 by virtue of using the open bottom end 215 to slide onto the top of the lid 224, down the basin 226 and around the bottom portion of the container. Due to the elastic or resilient inner surface 213, the outer covering 212, including the open bottom end 215, may slightly and temporarily stretch in order to be disposed in the operative orientation and fit in a confronting and/or tight relation with the container 220. In such an embodiment, the outer covering 212 may slide onto the container 220 much like a sock slides onto a person's foot and/or similar to the way a golf club cover slides onto the head of a golf club.

Furthermore, and referring now to FIG. 11, the outer covering 212 may, in addition to or instead of the open bottom end 215, comprise a securing assembly 216 cooperatively structured to facilitate disposition of the outer covering 212 between a removed orientation and the operative, confronting orientation. In particular, the securing assembly 216 is preferably disposed on a rear side of the covering assembly 212 and is capable of being disposed between an engaged, connected relation (for maintaining the outer covering 212 in the operative confronting orientation) and a released relation (for facilitating removal of the outer covering 212). Specifically, the securing assembly 216 may comprise any number of attachment or securing mechanisms and may be disposed at least partially along a vertical, horizontal or other portion of the outer covering 212. Accordingly, the securing assembly 216 may comprise one or more zippers, hook and loop fasteners, snaps, buttons, pins, clasps, etc.

As shown in the assembled side view of FIG. 12, the aquatic tank 200 of at least one embodiment comprises a substantially or completely flat back surface 202. In particular, the flat back surface 202 is structured to facilitate the aquatic tank 200 being disposed in an at least partially confronting engagement or relation with a corresponding flat vertical support surface, such as a wall, the back of a bookcase, desk, etc. as illustrated, the aquatic tank 200 comprises a tail appendage 219' disposed at the back surface 202. The tail appendage 219' may but need not be included, although it should not substantially interfere with the rear support surface just described.

Figure 13A:
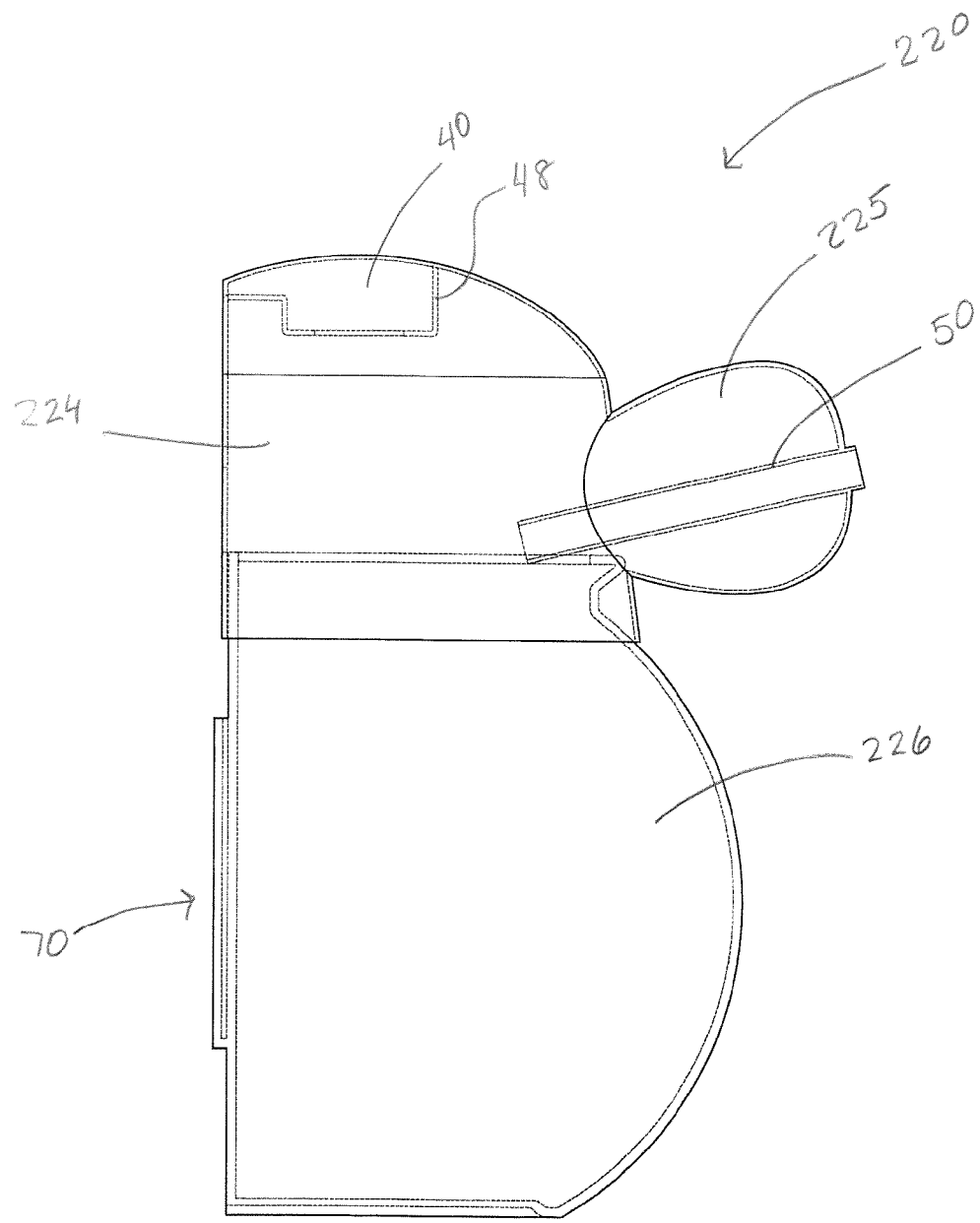
FIGS. 13A and 13B are side views of two variations of the container used in connection with certain embodiments of the present invention.
Figure 13B:
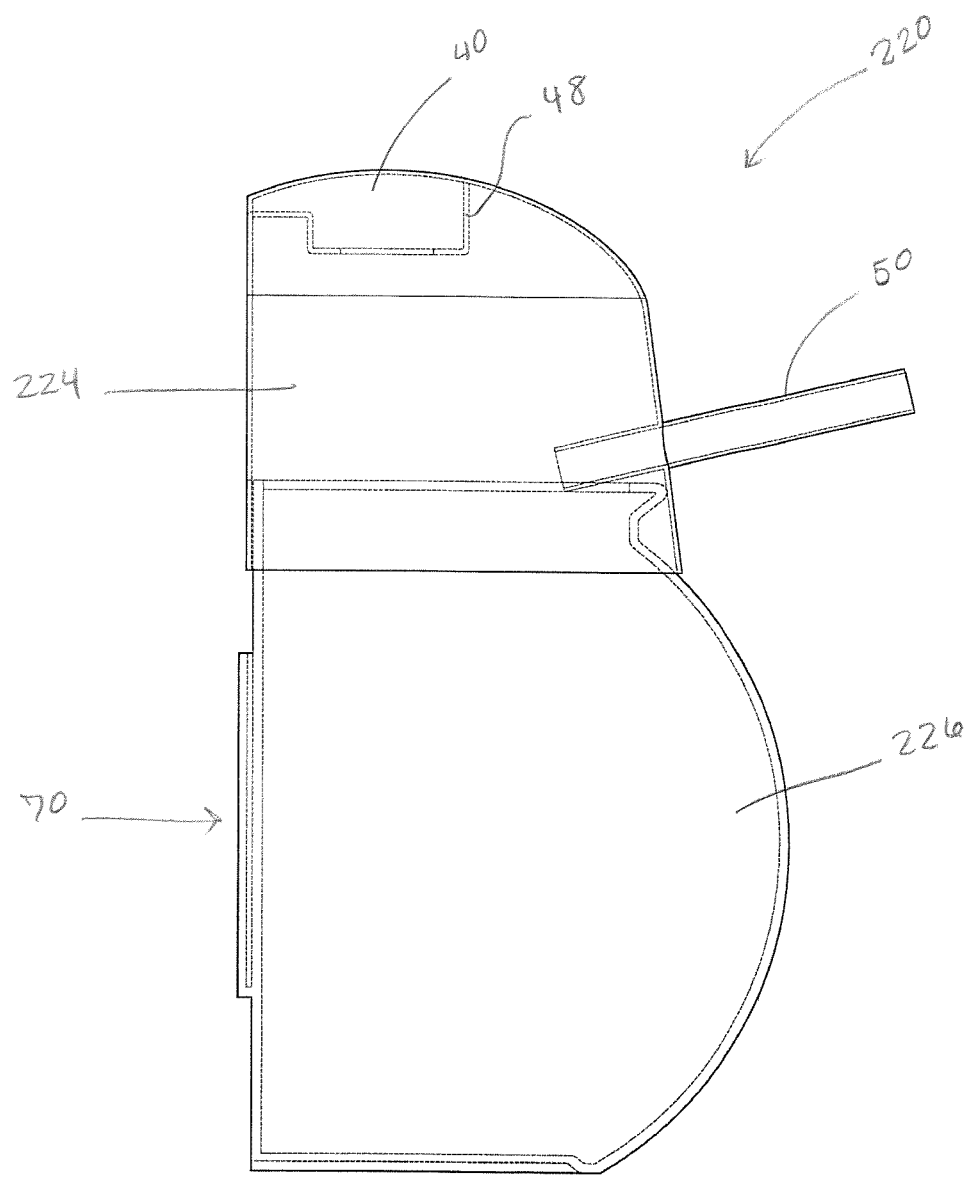

FIGS. 13A and 13B represent two embodiments of the container 220 of the present invention, wherein the lid 224 may, but need not necessarily, include a muzzle 225 (as illustrated in FIG. 13A). The muzzle 225 generally comprises a support structure used to support and/or enclose the access channel 50 and facilitate an easy connection of the outer covering to the container 220 and around access channel 50 and muzzle 225. For instance, the muzzle or support structure 225 may comprise molded plastic, acrylic, plush material, stuffing, etc. The outer covering 212 is therefore structured to be disposed around the muzzle 225 or otherwise in an at least partially confronting relation with the muzzle 225. Of course, the use of and/or shape of the muzzle 225 or other support structure is dependant upon the particular animate object which the outer covering is intended to resemble. Therefore, as illustrated in FIG. 13B, the lid 224 or container 220 need not necessarily comprise a muzzle 225.

It should also be noted, that as shown in FIGS. 13A and 13B, the lighting assembly 40 of at least one embodiment comprises an outer casing or protective housing 48 disposed in a substantially encompassing or encasing relation relative to the lighting assembly 40, while allowing the lighting assembly 40 to still illuminate at least a portion of the interior of the container or basin. Specifically, the outer casing 48 is structure to at least partially protect the lighting assembly 40, for example, from any inadvertent splashes, water, condensation, debris, etc. The casing 48 may comprise opening(s), holes or other light permeable portions structured to allow the emitted light to pass there through. The openings or portions (not shown) may include passage holes or clear protective lenses or covering thereon. Of course, the lenses may include any one or more colors or shades, and may in some embodiments be removable, replaceable, interchangeable, or otherwise selectable in order to modify the light or color of light emitted into the basin or container.

Figure 14:
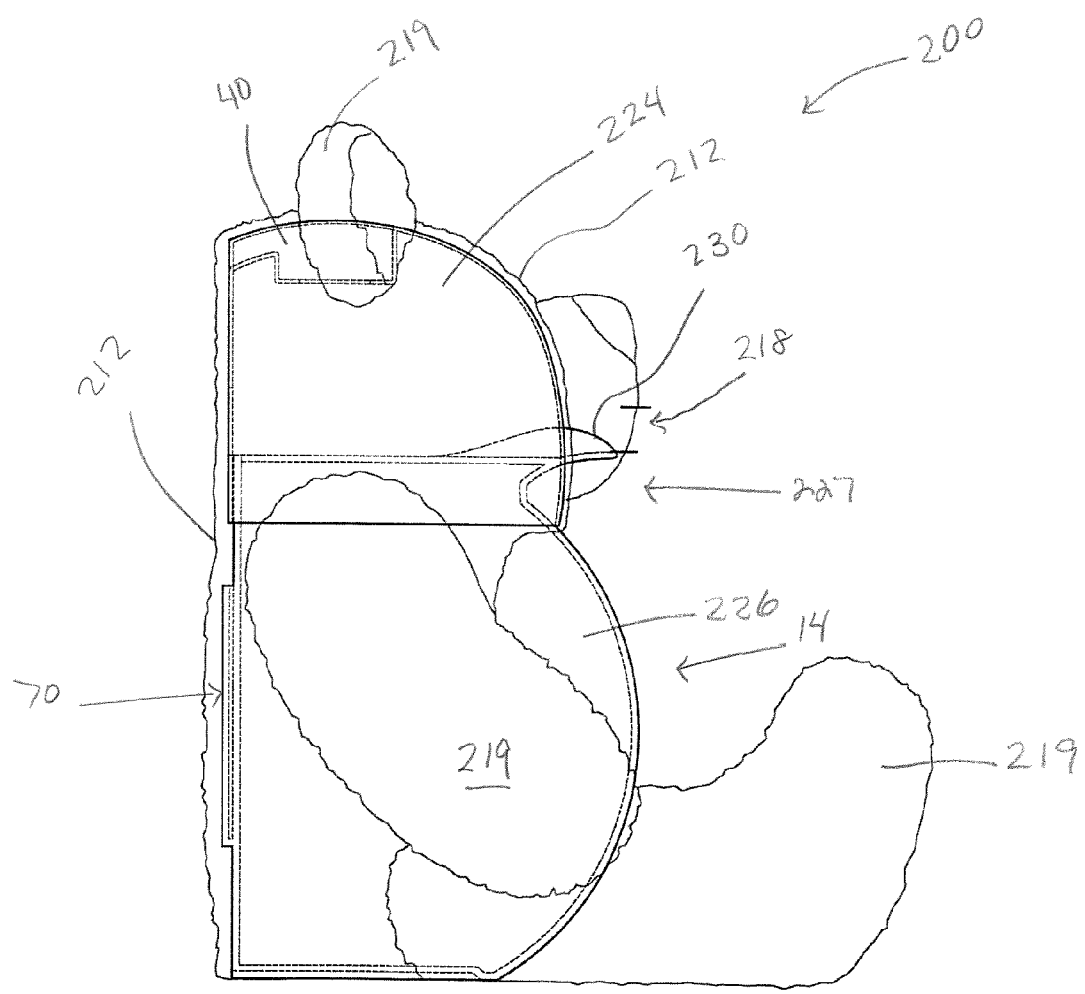
FIG. 14 is a side view of yet another embodiment of the habitat enclosure as disclosed herein.

Referring now to FIG. 14, the container 220 of yet another embodiment of the present invention comprises an access edge or lip 230 communicatively disposed with, adjacent to, or otherwise proximate an opening 218 of the outer covering in order to at least partially define the access channel 250. Specifically, the container 220 itself (including the lid 224 and/or the basin 226) of at least one embodiment comprises an edge or lip 230 disposed in an adjacent relation to a corresponding opening 218 through the outer covering 212 in order to define an access opening 250 from a point exterior of the outer covering 212 and into the interior portion of the container 220. As illustrated, the access edge 230 is disposed at an upper portion 227 of the container 220.

For instance, in the embodiment illustrated in FIG. 14, the access edge 230 of the container 220 comprises a lip or pour spout which meets or is proximate the opening 218 in the outer covering 211. Specifically, the pour spout or access edge 218, in the embodiment shown, meets or is adjacent the opening 218 which, in the illustrated example, happens to coincide with the mouth of the animate object. Accordingly, the access channel 250 of such an embodiment does not need to include a tube and, in addition to the access channel 250 being used as a feeding port and/or air port, the pour spout or other adjacently disposed access edge 218 allows for easy dispensing of the liquid or other contents inside the container 220 without having to remove the outer covering 212 or lid 224. Instead, a user can pour the liquid out of the container for easy cleaning or replenishing.

Figure 15A:
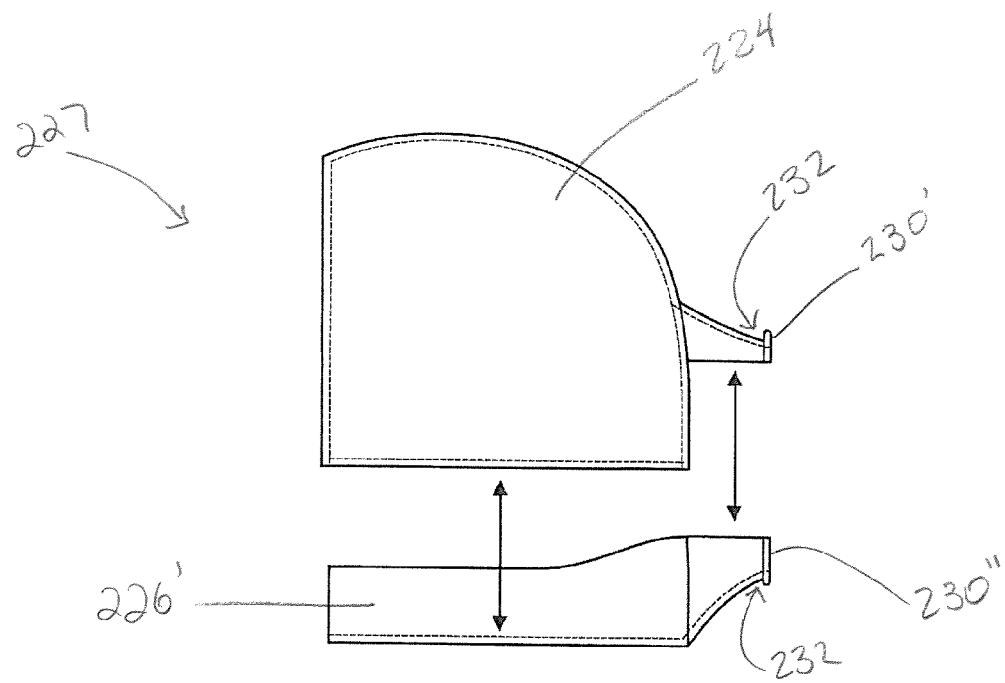
FIG. 15A is an exploded view of the upper portion of the container of one embodiment.
Figure 15B:
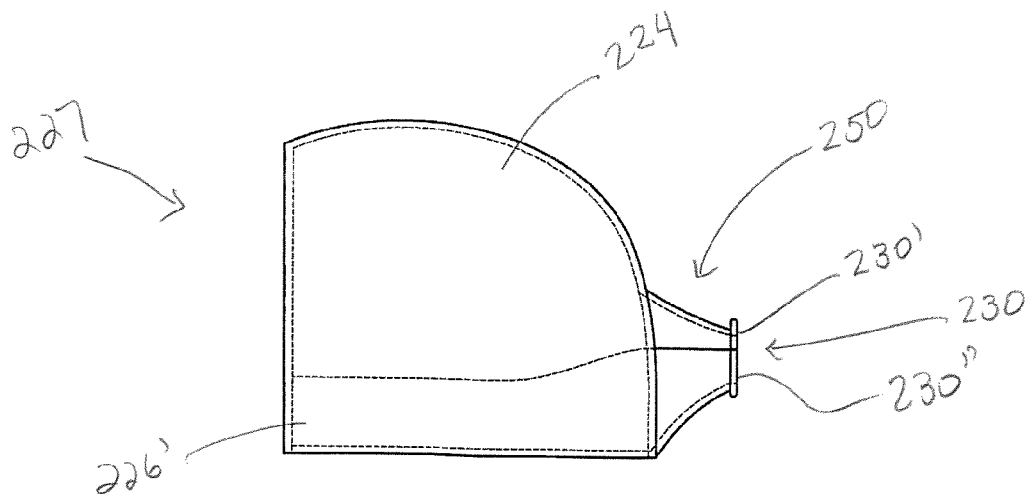
FIG. 15B is the upper portion of the container illustrated in FIG. 15A in assembled form.
Figure 15C:
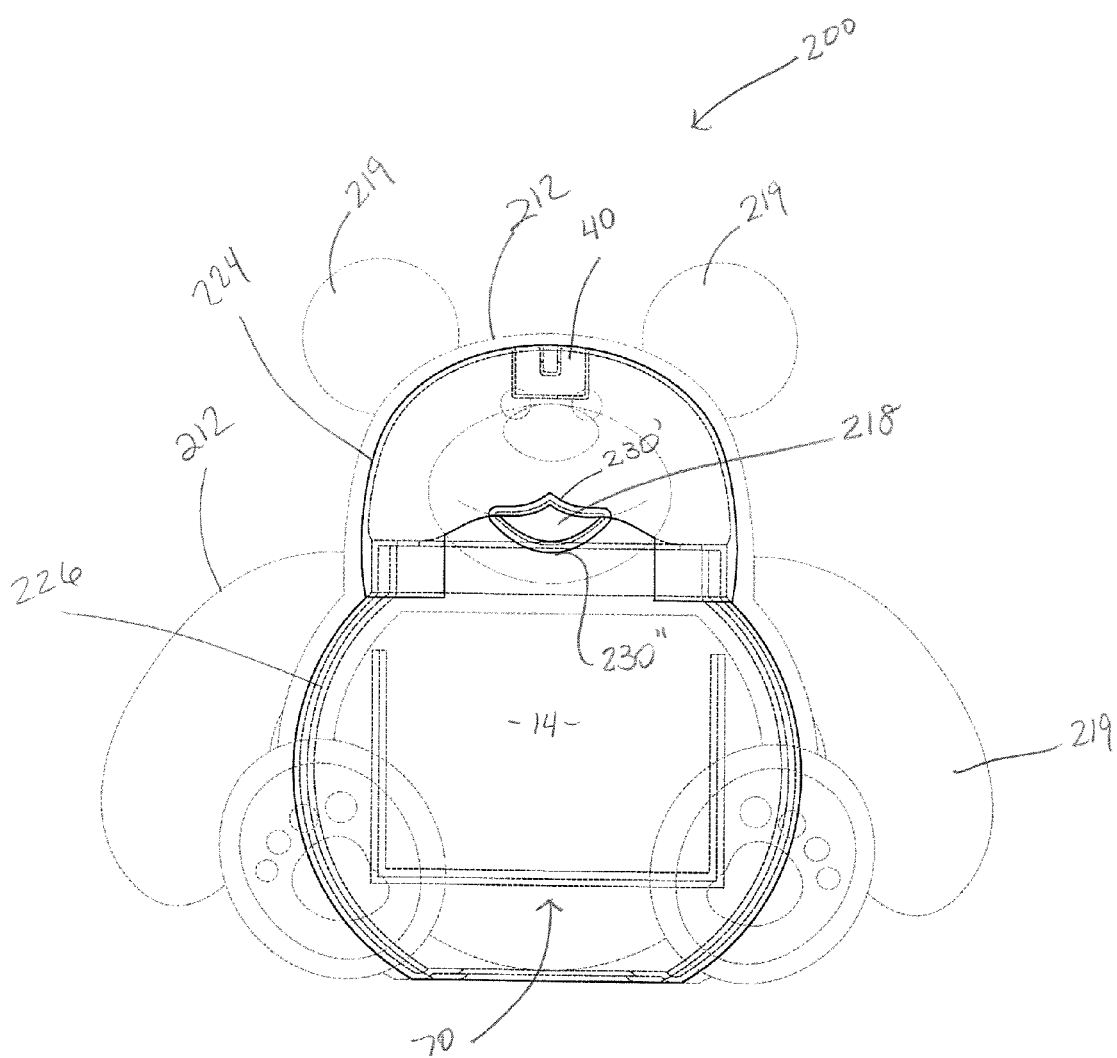
FIG. 15C is a front view of habitat enclosure using the container portions illustrated in FIGS. 15A and 15B.

Additional structural variations of the access channel 250, and in particular, the access edge 230 are shown in FIGS. 15A through 15C. Specifically, upper portion 227 of the container 220 in at least one embodiment may comprise the lid 224 and a top end 226' of the basin 226. More in particular, FIGS. 15A and 15B show the lid 224 of at least one embodiment as it removably connects to the top end 226' of the basin 226. Further, the lid 224 and the basin 226 each comprise cooperatively structured, adjacently disposed edges 230' and 230" structured to at least partially define the access edge 230, at least when the lid 224 is disposed in a connected relation with the basin 226 (as illustrated in FIGS. 15B and 15C). Moreover, when the lid 224 is connected to the basin 226, the edges 230' and 230" are structured and disposed to form an opening which at least partially defines the access channel 250 into the interior portion of the container 220. Therefore, when the outer covering 212 is disposed in the operative, confronting relation with the container 220, as described above, the edges 230' and 230" are disposed proximate or in an at least partially abutting relation with peripheral edges of the opening 218 of the outer covering 212. For instance, in at least one embodiment, the outer covering 212, and in particular the peripheral edges defining opening 218, may be disposed around outer edges 230' and 230". Specifically, the outer covering 212 of at least one embodiment may engage or be disposed in a confronting relation with a peripheral lip 232 defined by the edges 230' and 230" such that edges 230' and 230" are at least partially exteriorly disposed relative to the outer covering 212. Of course other cooperative engagements or dispositions between the outer covering 212 and the access edge 230 (such as edges 230' and 230") may be implemented. In any event, the access channel 250 is therefore defined as the passageway through opening 218 of the outer covering 212, through the access edge 230 (e.g., adjacent edges 230' and 230"), and into the interior portion of the container 220.

Furthermore, the various embodiments of the present invention may in addition comprise one or more removable accessories removably connected to portions of the aquatic tank 200 by virtues of attachment assemblies. For example, the accessories may include, but are certainly not limited to, one or more bow ties, hats, scarves, gloves, shirts, pants, shoes, sandals, athletic equipments, including footballs, baseballs, soccer balls, tennis balls, baseball bats, tennis rackets, etc. The various attachment assemblies may include VELCRO or other hook and loop fasteners, magnets, snaps, buttons, etc. For exemplary purposes only, in the embodiment where the accessories comprises a bow tie and the attachment assembly comprises cooperatively structured magnets, the bow ties each include a magnet, and the aquatic tank comprises one or more cooperatively structured magnets disposed, for example, on the outer covering 212, at nor near the ears, neckline, etc. As such, the bow ties, and other accessories may be removably disposed to the aquatic tank 200 and in particular, to various predetermined or desired portions of the outer covering 212.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A habitat enclosure comprising:
a container comprising an at least partially hollow interior portion structured to house a living creature therein, said container further comprising a basin and a lid, said lid being disposed in a removable relation with said basin,
an outer covering disposed in an least partially surrounding relation to said container, said outer covering being structured to at least partially resemble an animate object,
said outer covering comprising at least one display area disposed on a predetermined portion thereof, said container being at least partially viewable through said at least one display area,
at least one access channel disposed through said outer covering and into a communicative relation with an upper portion of said container,
said container further comprising an access edge communicatively disposed with an opening of said outer covering in order to at least partially define said access channel,
said lid and said basin comprising cooperatively structured, adjacently disposed edges structured to define said access edge at least when said lid is disposed in a connected relation with said basin, and
wherein said access channel comprises a pour spout structured to allow disposal of one or more liquids contained in said container there through without removal of said outer covering from an operative, confronting relation with said container.

2. The habitat enclosure as recited in claim 1 wherein said outer covering comprises an inner surface structured to removably confront an outer surface of said container.

3. The habitat enclosure as recited in claim 2 wherein at least a portion of said outer covering comprises an elasticity structured to facilitate a removable confronting relation between said outer covering and said container.

4. The habitat enclosure as recited in claim 2 wherein said outer covering further comprises a securing assembly structured to facilitate disposition of said outer covering between a removed orientation and an operative, confronting orientation; said operative, engaged relation being defined as said inner surface of said outer covering being disposed in a removably confronting relation with said outer surface of said container.

5. The habitat enclosure as recited in claim 2 wherein said outer covering comprises an open bottom end structured to allow a bottom end of said container to directly contact a supporting surface.

6. The habitat enclosure as recited in claim 5 wherein said outer covering comprises a one-piece construction.

7. The habitat enclosure as recited in claim 1 wherein said outer covering is disposed in a removably confronting relation with said lid.

8. The habitat enclosure as recited in claim 7 wherein said outer covering further comprises a securing assembly structured to facilitate disposition of said outer covering between a removed orientation and an operative, confronting orientation; said operative, confronting orientation being defined as said inner surface of said outer covering being disposed in a removably confronting relation with said outer surface of said container and said lid.

9. The habitat enclosure as recited in claim 8 wherein said outer covering is structured to compress said lid into said connected relation with said container while said outer covering is disposed in said operative, confronting orientation.

10. The habitat enclosure as recited in claim 1 wherein each of said cooperatively structured, adjacently disposed edges of said lid and said basin are disposed in an abutting relation with said opening of said outer covering.

11. The habitat enclosure as recited in claim 1 further comprising a lighting assembly disposed within said lid and structured to illuminate said interior portion of said container.

12. The habitat enclosure as recited in claim 11 wherein said outer covering comprises a substantially plush material.

13. The habitat enclosure as recited in claim 12 wherein said outer covering comprises a plurality of stuffed appendages.

14. The habitat enclosure as recited in claim 13 wherein said plurality of stuffed appendages are isolated from an interior surface of said outer covering; said interior surface of said outer covering being disposed in a removably confronting relation with said container.

15. The habitat enclosure as recited in claim 1 wherein said access channel comprises an elongated tube comprising an end disposed in a communicative relation with a cooperatively structured opening though said outer covering.

16. An aquatic tank comprising:
a container and an at least partially flexible and plush outer covering,
said container comprising a removable lid and a basin, said basin comprising an at least partially hollow interior portion,
said outer covering disposed in a substantially surrounding and confronting relation to said container, said outer covering comprising a plurality of appendages and structured to at least partially resemble an animate object,
said outer covering comprising at least one display area disposed on a predetermined portion thereof, wherein said container is at least partially viewable through said at least one display area,
at least one access channel disposed through said outer covering and into a communicative relation with said interior portion of said container,
said container comprises an access edge communicatively disposed with an opening of said outer covering in order to at least partially define said at least one access channel, and
wherein said lid and said basin comprise cooperatively structured, adjacently disposed edges structured to define said access edge at least when said lid is disposed in a connected relation with said basin.

17. The aquatic tank as recited in claim 16 wherein said access channel comprises a pour spout at least partially formed at an upper portion of said container.

18. A habitat enclosure comprising:
a container comprising on at least partially hollow interior portion structured to house a living creature therein,
an outer covering disposed in an least partially surrounding relation to said container, said outer covering being structured to at least partially resemble an animate object,
said outer covering comprising at least one display area disposed on a predetermined portion thereof, said container being at least partially viewable through said at least one display area,
at least one access channel disposed through said outer covering and into a communicative relation with an upper portion of said container, and
an image display assembly disposable in a supporting relation with at least one removable image, said image display assembly being connected on a rear exterior portion of said container and positioned to display the at least one removable image through said container and through said display area of said outer covering.

* * * * *